United States Patent [19]
Lee

[11] Patent Number: 5,822,160
[45] Date of Patent: Oct. 13, 1998

[54] FULL ERASE HEAD WITH GUIDE PORTION BEING SUPPORTED BY THE TAPE GUIDE POST OF VCR

[75] Inventor: Ji Young Lee, Seoul, Rep. of Korea

[73] Assignee: LG Electronics Inc., Seoul, Rep. of Korea

[21] Appl. No.: 600,006

[22] Filed: Feb. 14, 1996

[30] Foreign Application Priority Data

Feb. 14, 1995 [KR] Rep. of Korea ............... 2291/1995

[51] Int. Cl.⁶ ........................................ G11B 5/49
[52] U.S. Cl. ........................................ 360/118; 360/104
[58] Field of Search .............................. 360/118, 121, 360/66, 104, 129, 85

[56] References Cited

U.S. PATENT DOCUMENTS 5,444,588 8/1995 Choi ........................................ 360/104

FOREIGN PATENT DOCUMENTS

| 56-54669 | 5/1981 | Japan | 360/104 |
| 61-236013 | 10/1986 | Japan | 360/118 |
| 1-179204 | 7/1989 | Japan | 360/118 |

*Primary Examiner*—John H. Wolff
*Assistant Examiner*—Kevin M. Watkins
*Attorney, Agent, or Firm*—Morgan, Lewis and Bockius LLP

[57] ABSTRACT

A full erase head assembly for erasing a signal recorded on a tape includes a full erase head, a guide post installed on a deck base for guiding the tape, a guide portion formed on a first side of the full erase head, the guide portion being supported by the guide post, and a locking mechanism formed on a second side of the full erase head and coupled to the deck base, the locking mechanism preventing the full erase head from separating from the deck base.

10 Claims, 3 Drawing Sheets

FULL ERASE HEAD WITH GUIDE PORTION BEING SUPPORTED BY THE TAPE GUIDE POST OF VCR

BACKGROUND OF THE INVENTION

1. Field of the Invention

The present invention relates to a full erase head assembly for a video cassette recorder (VCR), and more particularly, to a full head assembly for a VCR which can be easily attached to a deck base and coupled to a printed circuit board (PCB).

2. Discussion of the Related Art

A VCR is an apparatus for reading and reproducing video and audio signals recorded on a magnetic tape via a magnetic head. It can also be used to record external video and audio signals on magnetic tape via the magnetic head. As shown in FIG. 1, when a VCR's playback mode is selected and a cassette 1 is inserted thereunto, a capstan shaft 4 rotates along with a drum 3 installed in deck base 2 at a predetermined slope. In this state, left and right moving plates 6 and 6a moveably installed along a guide path formed in the deck base 2 are shifted toward the drum so that guide rollers 7 and 7a and inclined posts 8 and 8a installed on the moving plates 6 and 6a draw a tape 9 out of cassette 1 and make the drawn-out tape 9 come into contact the rotating drum 3. At the same time, a pinch roller 10 moves to allow the tape 9 to make tight contact with the rotating capstan shaft 4. Here, tape 9 directly receives rotational force of the capstan shaft force 4 and the auxiliarily receives the rotational force of the pinchroller 10. As a result, tape 9 travels in the direction marked by the arrows in FIG. 1 while guided by a plurality of guide posts 11 and coming into contact with the drum 3 and a full erase head 12. When the playback mode is selected, an erase signal is not applied to the full erase head 12 so that the video and audio signals recorded on tape 9 are not erased by the full erase head 12. Therefore, the playback is performed by reading out the video and audio signals recorded on tape 9 via the magnetic head of drum 3 (not shown).

If the recording mode is selected when cassette 1 is inserted into the apparatus, the tape 9 travels while coming into contact with the drum 3 and the full erase head 12, similar to the aforementioned reproducing mode. Here, the erase signal is applied to the full erase head 12 so that the video and audio signals recorded on tape 9 are erased. The magnetic head of drum 3 then records video and audio signals on the tape 9.

In the VCR discussed above, the full erase head 12 erases video and audio signals previously recorded on a tape in the recording mode, and it is assembled outside the deck base 2. A conventional full erase head assembly for a VCR is shown in FIGS. 1 and 2. A protrusion 14 and a screw inserting hole 15 are formed on a body 13 of the full erase head 12. A hole 16 is formed on the deck base 2, into which the protrusion 14 formed on the body 13 is fitted. In addition, a screw fastening hole 18 is formed on the deck base 2 to fix the body 13 of the full erase head 12 by a screw 17. One end of wire 20 is coupled to the top surface of the full erase head 12 by a head connector 19. The other end of wire 20 is coupled by a board connector 22 to a printed circuit board 21 which is fixed to deck base 2 (see FIG. 1).

When the protrusion 14 of the body 13 is fitted into the hole 16 in the deck base 2, the screw inserting hole 15 formed on the body 13 matches the screw fastening hole 18 formed on the deck base 2. The screw 17 is fitted into the screw inserting hole 15 and the screw fastening hole 18 to firmly secure the body 13 to the deck base 2. Inserting the protrusion 14 formed on the body 13 into the hole 16 formed in the deck base 2 is performed in order to accurately and firmly fix the body 13 of the full erase head 12 to the deck base 2 with the screw 17.

When the body 13 of the full head 12 is fixed to the deck base 2, one end of wire 20 is coupled to the top surface of the full erase head 12 by the head connector 19, and the other end of wire 20 to the printed circuit board 21 which is fixed to the deck base 2 by the board connector 22. This completes the assembly of the full erase head 12.

An operation will now be described in which the full erase head 12 assembly erases video and audio signals previously recorded on tape 9 in the recording mode.

When the recording mode is selected, the tape 9 travels while coming into contact with the full erase head 12. An erase signal controlled by the control circuit of the printed circuit board 21 is transmitted to the full erase head 12 via wire 20 so that video and audio signals recorded on tape 9 are erased according to the signal.

The conventional full erase head assembly has several disadvantages. The body of the full erase head is fixed to the deck base using a separate screw, and the full erase head is coupled to the printed circuit board with a wire. This increases assembly time. In addition, after being in use for a period of time, the screw fixing the full erase head to the deck base becomes loose or the wire coupling becomes poor, thus causing poor quality erase operation.

SUMMARY OF THE INVENTION

Accordingly, the present invention is directed to a full erase head assembly that substantially obviates one or more of the problems due to limitations and disadvantages of the related art. It is an object of the present invention to provide a full erase head assembly in which the body fixing portion of the full erase is modified to fix the body on the deck base without a screw, and the signal transmitting portion of the full erase head is modified for the full erase head to be directly coupled to a printed circuit board when the body of the base is assembled. This reduces assembling time, facilitates easy assembly, and performs the erasing operation smoothly even after being in use for a long period of time.

To accomplish the object of the present invention, there is provided an assembly of a full erase head for erasing a signal recorded on tape, the assembly comprising: a guide post installed on a deck base for guiding the conveyance of tape; a guide portion formed on one side of the full erase head, the portion being supported by the guide post; and locking means formed on one side of the full erase head and coupled to the deck base, the means preventing the full erase head from falling away.

DETAILED DESCRIPTION OF THE PREFERRED EMBODIMENTS

Figure 1:
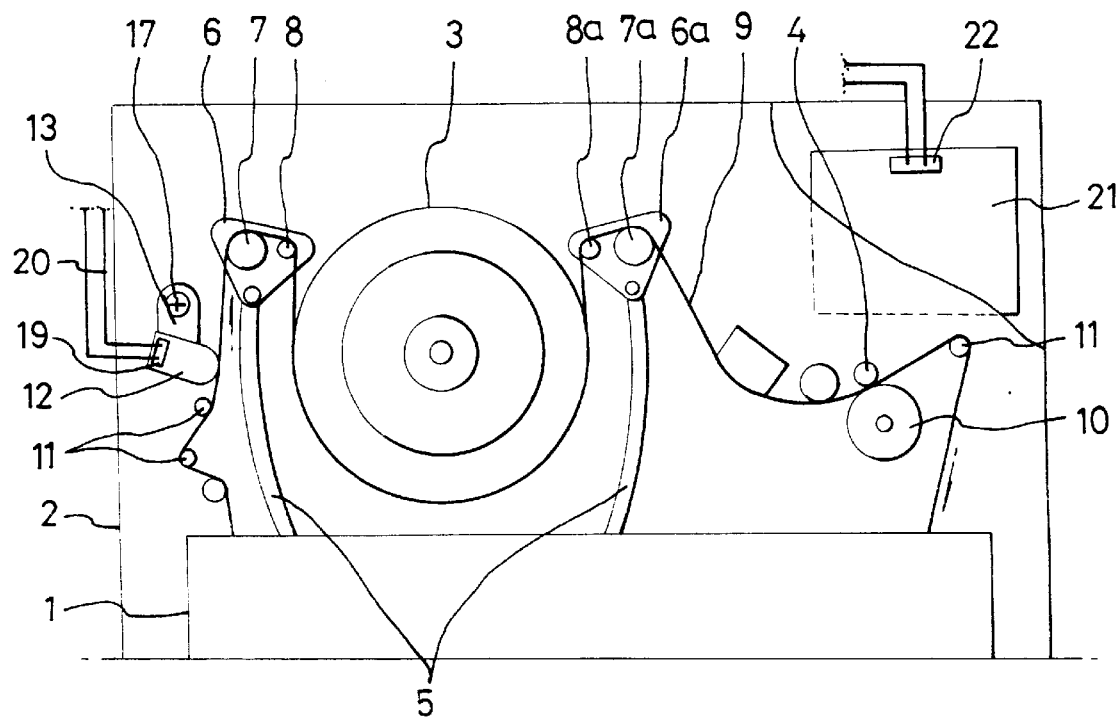
FIG. 1 is a plan view of a deck portion of a video cassette recorder, showing that the full erase head is assembled by a conventional apparatus.
Figure 2:
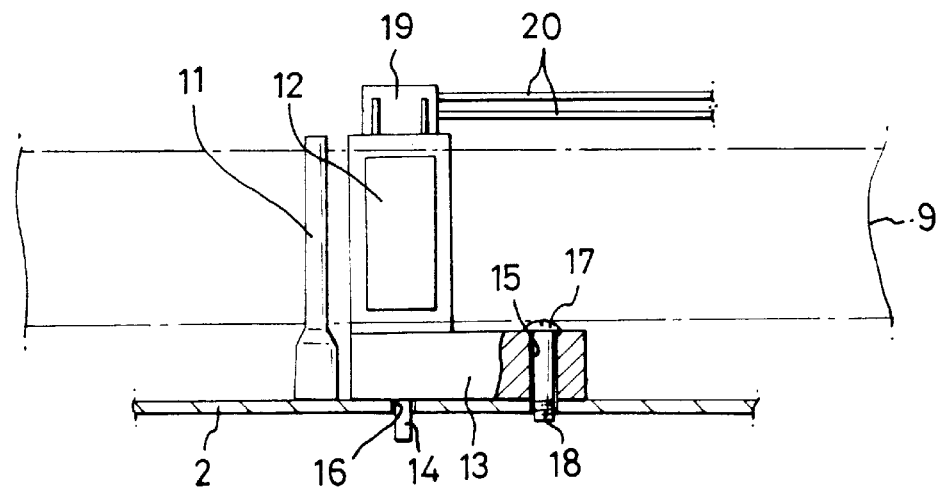
FIG. 2 is a vertical sectional view of important components of the deck, showing that the full erase head is assembled by the conventional apparatus.
Figure 3:
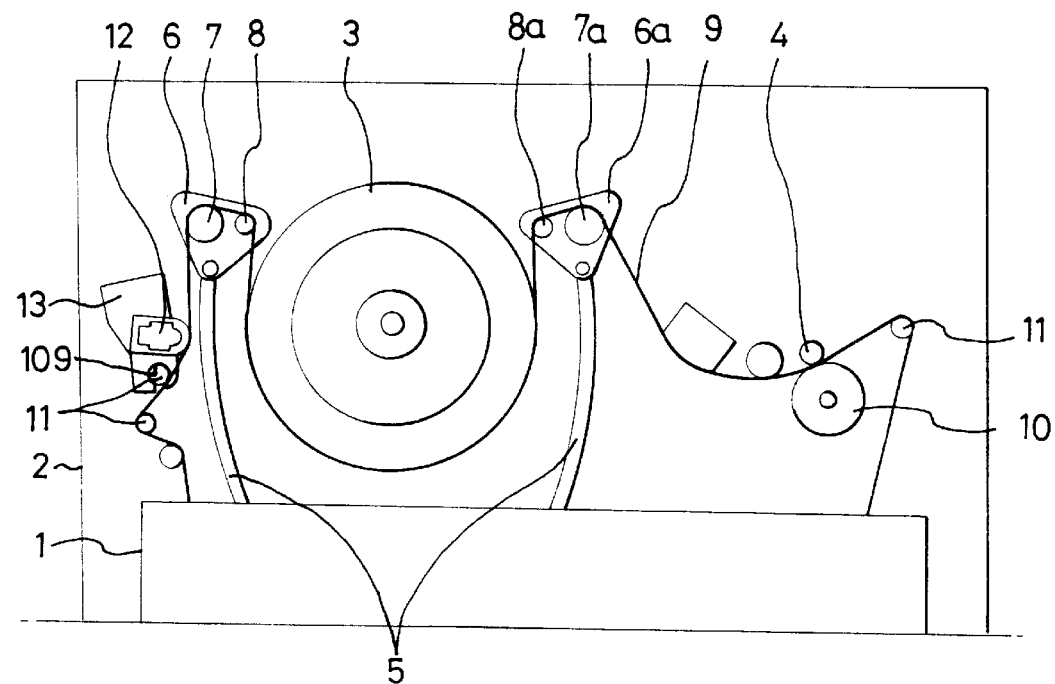
FIG. 3 is a plan view of a video cassette recorder, showing that the full erase head is assembled by an apparatus of the present invention.
Figure 4:
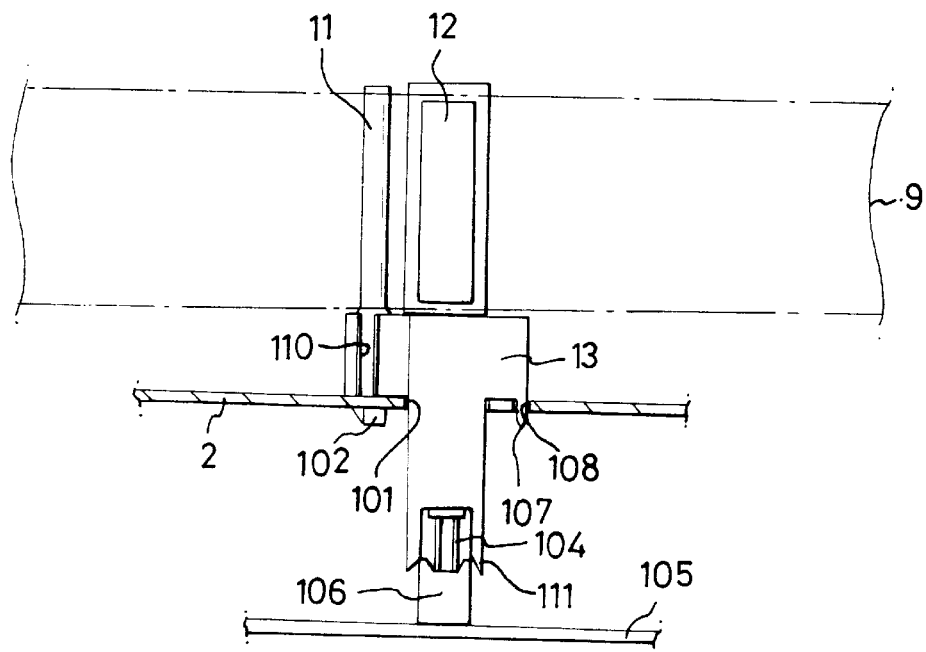
FIG. 4 is a vertical sectional view of important components of the recorder, showing that the full erase head is assembled by the apparatus of the present invention.
Figure 5:
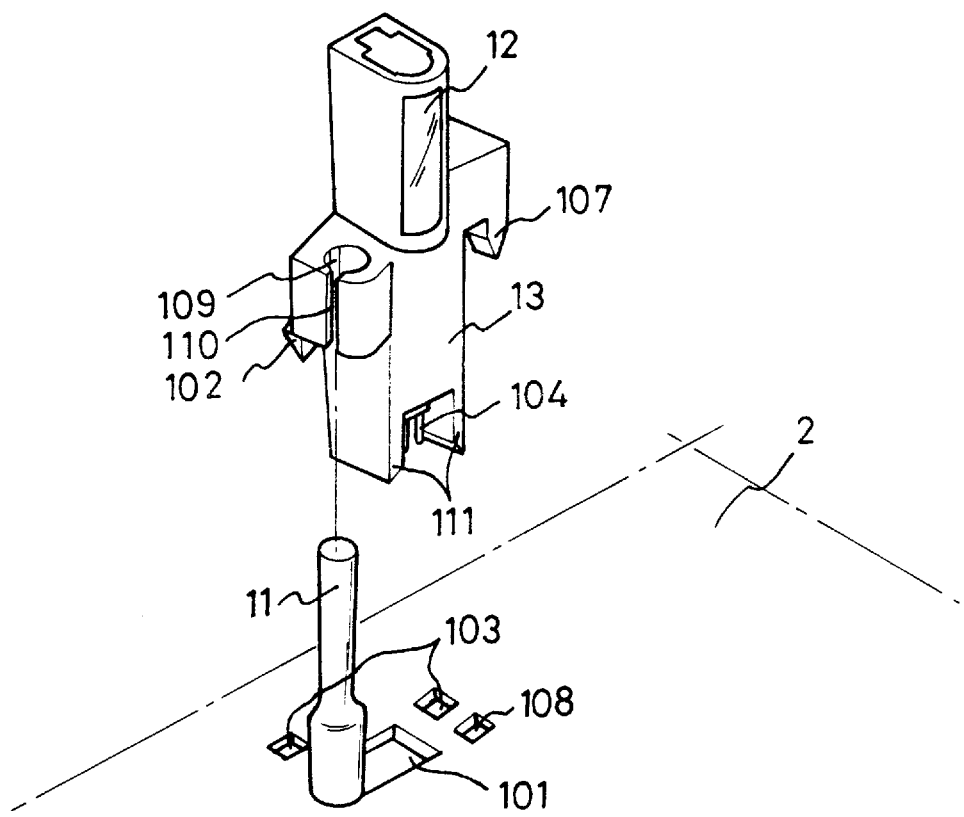
FIG. 5 is a perspective view of the recorder, showing that the full erase head is assembled by the apparatus of the present invention.

Hereinafter, a preferred embodiment of the present invention will be described with reference to FIGS. 3, 4 and 5.

In one embodiment of the present invention, an insertion hole 101 is formed in a deck base 2 so that a part of body 13 of a full erase head 12 is inserted into the insertion hole 101. On both sides of the body 13 of the full erase head 12, hooks 102 are formed downwardly, respectively. A pair of stop holes 103 are formed on the deck base 2 so that when body 13 is inserted into the insertion hole 101, hooks 102 are fitted into the stop holes 103 for locking purpose. Under the body 13 of the full erase head 12, a connection pin 104 is attached. Directly under the insertion hole 101, a board connector 106 coupled to a printed circuit board 105 is placed so that the connection pin 104 is connected to the board connector 106 of the printed circuit board 105 when the body 13 is inserted into the insertion hole 101 for locking. From the body 13 of the full erase head 12, a protrusion 107 is formed downwardly. A hole 108 is formed in deck base 2 so that the protrusion 107 is fitted into the hole 108 when the body 13 is locked onto the deck base 2. On one side of the body 13 of full erase head 12, a guide hole 109 is formed perpendicularly to be fitted onto a guide post 11 installed on deck base 2.

In addition, in the above configuration, a cut portion 110 is formed integrally on the guide hole 109 so that the guide hole 109 becomes elastic. Cut portion 110 facilitates the process of fitting guide hole 109 onto the guide post 11 installed on deck base 2. Around the connection pin 104 installed under body 13, a pin protecting portion 111 is formed to prevent connection pin 104 from being damaged or bent during the conveyance or assembly of full erase head 12. The pin protecting portion 111 also leads connection pin 104 to be smoothly coupled to board connector 106. In this embodiment of the present invention, guide hole 109 is placed at the lower end of the guide post 11. However, guide hole 109 may be placed on the upper end or on the upper and lower ends of guide post 11.

In the full erase head assembly of a VCR constructed as above, when body 13 of full erase head 12 is fitted into insertion hole 101 formed in deck base 2, a pair of hooks 102 formed downwardly on body 13 are inserted into a pair of stop holes 103 formed onto deck base 2 so that body 13 of full erase head 12 is locked onto deck base 2. When body 13 of full erase head 12 is locked on deck base 2, protrusion 107 formed downwardly on body 13 is fitted into hole 108 formed on deck 2. The guide post 11 acting to guide the conveyance of tape is inserted into the guide hole 109 formed perpendicularly on one side of the body 13. Because cut portion 110 is formed integrally with guide hole 109, guide post 11 can be fitted into guide hole 109 smoothly.

Fitting protrusion 107 formed on body 13 of full erase head 12 into hole 108 formed in deck base 2 is performed in order to allow full erase head 112 to come into contact with the tape at a predetermined angle. Fitting guide post 11 installed on deck base 2 into guide hole 109 formed perpendicularly on one side of body 13 is performed in order for body 13 to be stabilized to have a predetermined supporting force while fixed to deck base 2. In addition, this guides the assembly position of full erase head 12 accurately.

Moreover, when body 13 of full erase head 12 is fixed to deck base 2, connection pin 104 installed under body 13 is connected to the printed circuit board 105 via the board connector 106 placed directly under insertion hole 101. As shown in FIG. 4, this enables the circuit of printed circuit board 105 to transmit signals with the full erase head 12 which is locked onto deck base 2.

As described above, in the full erase head assembly for a VCR of the present invention, the body of the full erase head is fixedly locked onto the deck base. When the body of the full erase head is fixed to the deck base, the full erase head is directly coupled to the board connector of the printed circuit board. This sharply reduces the assembling time. Furthermore, even after a long period of use, this assembler allows the erasing operation to be performed smoothly.

What is claimed:

1. A full erase head assembly for erasing a signal recorded on a tape comprising:
   a full erase head;
   a guide post installed on a deck base for guiding and contacting the tape;
   a guide portion formed on a first side of the full erase head, the guide portion being supported by the guide post; and
   locking means formed on a second side of the full erase head and coupled to the deck base, the locking means preventing the full erase head from separating from the deck base.

2. The assembly as claimed in claim 1, wherein the locking means comprises:
   a hook formed on a body of the full erase head;
   a stop hole formed in the deck base and into which the hook is inserted for locking; and
   a position determination means formed on a body of the full erase head.

3. The assembly as claimed in claim 2, wherein the position determination means comprises:
   a protrusion formed on the full erase head; and
   a hole formed in the deck base for receiving the protrusion.

4. The assembly as claimed in claim 3, wherein the hole receives the protrusion to thereby allow the full erase head to come into contact with a tape at a predetermined angle.

5. The assembly as claimed in claim 1, wherein the guide portion comprises:
   a guide hole formed within the guide portion wherein the guide post is inserted; and wherein
   the guide hole formed in the guide portion includes a cut portion facilitating elastic insertion of the guide post into the guide hole.

6. A full erase head assembly for erasing a signal recorded on a tape comprising:
   a full erase head;
   a guide post installed on a deck base for guiding and contacting the tape; and
   a guide portion formed on a side of the full erase head, the guide portion being supported by the guide post.

7. The assembly as claimed in claim 6, wherein the guide portion comprises:

a guide hole formed within the guide portion wherein the guide post is inserted; and wherein the guide hole formed in the guide portion includes a cut portion facilitating elastic insertion of the guide post into the guide hole.

8. The assembly as claimed in claim 6, further comprising:

a locking means including;

a hook formed on a body of the full erase head, a stop hole formed in the deck base and into which the hook is inserted for locking, and a position determination means formed on a body of the full erase head.

9. The assembly as claimed in claim 8, further comprising:

a protrusion formed on the full erase head; and a hole formed in the deck base for receiving the protrusion.

10. The assembly as claimed in claim 9, wherein the hole formed in the deck base receives the protrusion to thereby allow the full erase head to come into contact with a tape at a predetermined angle.

\* \* \* \* \*